United States Patent
Hayashi

(10) Patent No.: US 12,313,150 B2
(45) Date of Patent: May 27, 2025

(54) PLANETARY GEAR DEVICE

(71) Applicant: DAIDO KOGYO CO., LTD., Ishikawa (JP)

(72) Inventor: Kohei Hayashi, Ishikawa (JP)

(73) Assignee: DAIDO KOGYO CO., LTD., Ishikawa (JP)

( * ) Notice: Subject to any disclaimer, the term of this patent is extended or adjusted under 35 U.S.C. 154(b) by 0 days.

(21) Appl. No.: 18/956,453

(22) Filed: Nov. 22, 2024

(65) Prior Publication Data
US 2025/0084916 A1    Mar. 13, 2025

Related U.S. Application Data

(63) Continuation of application No. PCT/JP2023/019776, filed on May 26, 2023.

(30) Foreign Application Priority Data

May 30, 2022    (JP) ................. 2022-088068

(51) Int. Cl.
| | | |
|---|---|---|
| *F16H 37/02* | (2006.01) | |
| *F16H 7/06* | (2006.01) | |
| *F16H 9/24* | (2006.01) | |
| *B62M 11/14* | (2006.01) | |
| *B62M 11/18* | (2006.01) | |

(Continued)

(52) U.S. Cl.
CPC ............... *F16H 37/02* (2013.01); *F16H 9/24* (2013.01); *B62M 11/14* (2013.01); *B62M 11/18* (2013.01); *F16H 3/44* (2013.01); *F16H 7/06* (2013.01); *F16H 9/26* (2013.01); *F16H 37/022* (2013.01)

(58) Field of Classification Search
CPC .......... F16H 37/02; F16H 37/022; F16H 7/06; F16H 1/28; F16H 9/24; F16H 9/26; F16H 3/44; B62M 11/04; B62M 11/14; B62M 11/18
See application file for complete search history.

(56) References Cited

FOREIGN PATENT DOCUMENTS

| | | | | |
|---|---|---|---|---|
| EP | 4040015 A1 | * | 8/2022 | ........... B60K 17/043 |
| JP | 2-88383 | | 3/1990 | |

(Continued)

OTHER PUBLICATIONS

International Search Report issued Aug. 1, 2023 in corresponding International Application No. PCT/JP2023/019776.

*Primary Examiner* — Tinh Dang
(74) *Attorney, Agent, or Firm* — Wenderoth, Lind & Ponack, L.L.P.

(57) ABSTRACT

A planetary gear device (1) includes a sun gear (5), a carrier (6), a plurality of planetary units (7) provided on the carrier (6), and a ring gear (9). Each of the planetary units (7) includes a first planetary gear (71) meshing with the sun gear (5), a second planetary gear (72) meshing with the ring gear (9), a first rotating body (73) disposed coaxially with the first planetary gear (71), a second rotating body (74) disposed coaxially with the second planetary gear (72), and a winding transmission body (75) wound around the first rotating body (73) and the second rotating body (74). Each of the winding transmission bodies (75) of the plurality of planetary units (7) is arranged such that at least a part thereof overlaps with another winding transmission body in an axial direction when viewed from a direction orthogonal to the axial direction.

1 Claim, 5 Drawing Sheets

(51) Int. Cl.
*F16H 3/44* (2006.01)
*F16H 9/26* (2006.01)

(56) References Cited

FOREIGN PATENT DOCUMENTS

JP          6-69494     9/1994
KR    100899635 B1 *  5/2009  ............... F16H 9/26

\* cited by examiner

PLANETARY GEAR DEVICE

CROSS-REFERENCE TO RELATED APPLICATIONS

This application is a Continuation of International Patent Application No. PCT/JP2023/19776, filed May 26, 2023 which claims the benefit of Japanese Patent Application No. 2022-88068, filed May 30, 2022, both of which are hereby incorporated by reference herein in their entirety.

BACKGROUND OF THE INVENTION

Field of the Invention

The present invention relates to a planetary gear device.

Background Art

In recent years, a planetary transmission including a casing, two sun gears, a planet carrier, two planetary gears, a meshed vehicle, and two toothed belts have been devised (See Patent Literature 1). Each of the two planetary gears is formed by integrating a small-diameter gear and a large-diameter sprocket, and the large-diameter sprocket of each of the planetary gears meshes with the meshed vehicle.

One of the two toothed belts is wound around one sun gear of the two sun gears and a small diameter gear of one planetary gear of the two planetary gears, and the other of the two toothed belts is wound around the other sun gear of the two planetary gears and the small diameter gear of the other planetary gear of the two planetary gears.

CITATION LIST

Patent Literature

Patent Literature 1: JP H06-69494 U

The planetary transmission of Patent Literature 1 can function as a speed reducer that outputs deceleration rotation from a planetary carrier by fixing a meshed vehicle among three elements of a sun gear, a planetary carrier, and a meshed vehicle and using the sun gear as an input. In addition, by fixing the meshed vehicle and using the planet carrier as an input, it is possible to function as a speed-up gear that outputs accelerated rotation from the sun gear.

However, in the planetary transmission of Patent Literature 1, since the two toothed belts are arranged to be offset in a rotation axis direction, there is a problem that the axial length of the planetary transmission becomes long. In particular, in the case of this configuration, there is a problem that the axial length of the planetary transmission becomes longer as the number of the planetary gears and the toothed belt increases.

SUMMARY OF THE INVENTION

According to one aspect of the present invention, a planetary gear device includes a sun gear, a carrier, a plurality of planetary units provided on the carrier, and a ring gear, wherein each of the planetary units includes a first planetary gear meshed with the sun gear and rotatably supported by the carrier, a second planetary gear meshed with the ring gear and rotatably supported by the carrier, a first rotating body arranged coaxially with the first planetary gear, a second rotating body arranged coaxially with the second planetary gear, and a winding transmission body wound around the first rotating body and the second rotating body, and each of the winding transmission bodies of the plurality of planetary units is arranged such that at least a part of the winding transmission body overlaps with another winding transmission body in an axial direction when viewed from a direction orthogonal to the axial direction.

Further features of the present invention will become apparent from the following description of exemplary embodiments with reference to the attached drawings.

DESCRIPTION OF THE EMBODIMENTS

Hereinafter, embodiments of the present invention will be described with reference to the drawings.

Schematic Configuration of Chain-type Planetary Sprocket Reducer

Figure 1:
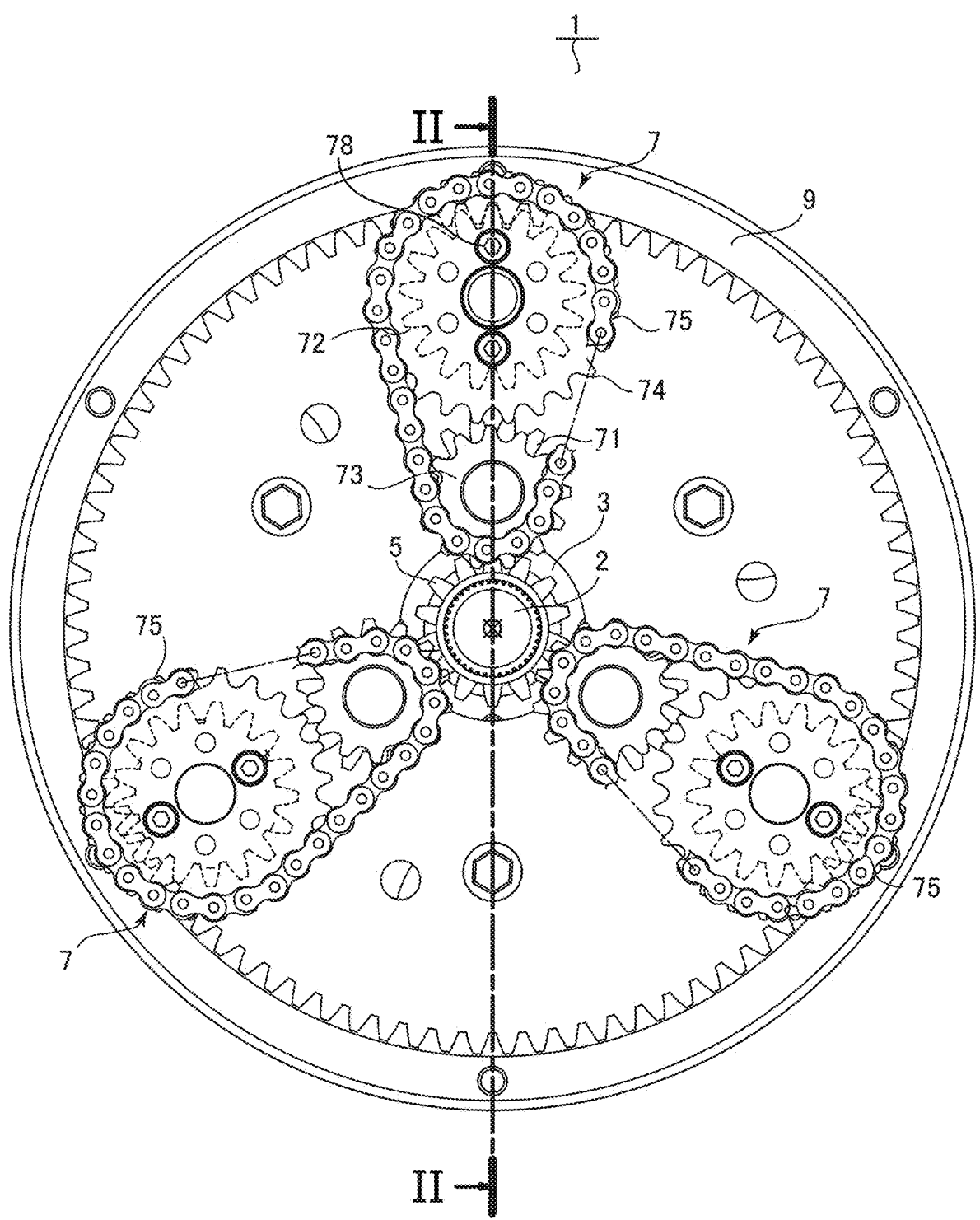
FIG. 1 is a front view illustrating a planetary gear device according to a present embodiment in a state where a carrier is removed.
Figure 2:
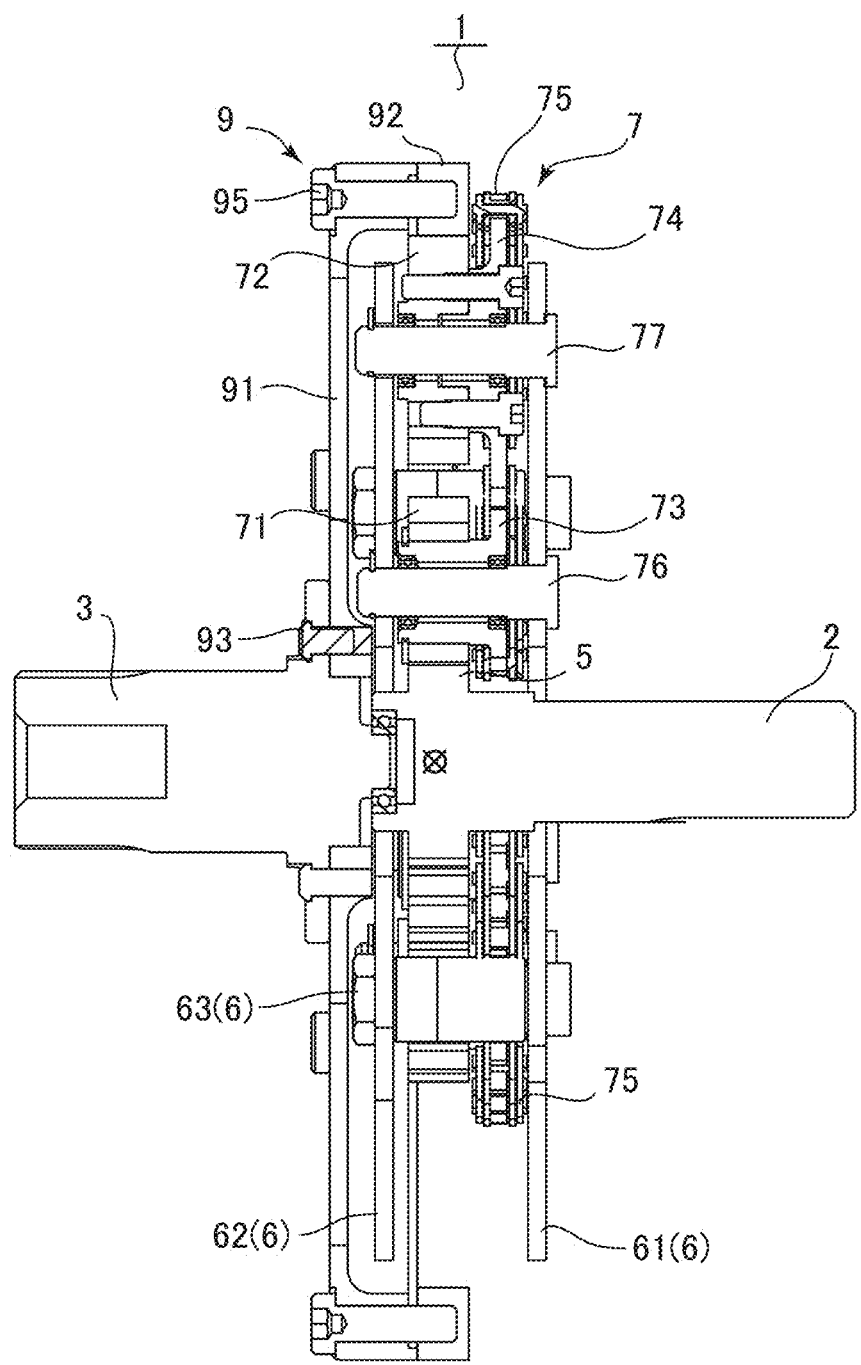
FIG. 2 is a cross-sectional view taken along line II-II of the planetary gear device illustrated in FIG. 1.

FIG. 1 is a chain-type planetary sprocket reducer 1 as a planetary gear device according to the present embodiment. As illustrated in FIG. 2, the chain-type planetary sprocket reducer 1 is disposed between an input shaft 2 as a first shaft to which input rotation is transmitted from a drive source (not illustrated) and an output shaft 3 as a second shaft of which an axis coincides with the input shaft 2, and is a speed reducer that decelerates and outputs the input rotation input to the input shaft 2 from the output shaft 3.

Specifically, the speed reducer 1 includes a sun gear 5 provided on the input shaft 2, a carrier 6, a plurality of (three in the present embodiment) planetary units 7 provided on the carrier 6, and a ring gear (internal gear) 9 provided on the output shaft 3. When the input shaft 2 is rotationally driven by a driving force from a driving source such as a motor of a motorcycle, the sun gear 5 rotates integrally with the input shaft 2.

The carrier 6 is configured by connecting a pair of circular flat plates 61 and 62 with a predetermined interval in the axial direction by a collar bolt 63 as a fastener, and a plurality of planetary units 7 are arranged between the flat plates 61 and 62. In the present embodiment, the carrier 6 is configured to be fixed to a fixing member (not illustrated).

Each of the plurality of planetary units 7 includes a first planetary gear 71 meshing with the sun gear 5, a second planetary gear 72 meshing with the ring gear 9, a first planetary sprocket 73, a second planetary sprocket 74, and a planetary chain 75 wound around the first planetary sprocket 73 and the second planetary sprocket 74.

The first planetary gear 71 is rotatably supported by the carrier 6 via the first planetary shaft 76. In addition, the first planetary shaft 76 is provided with the first planetary sprocket 73, and the first planetary sprocket 73 and the first planetary gear 71 are configured to rotate integrally. More specifically, the first planetary sprocket 73 is rotatably supported with respect to the first planetary shaft 76, and the first planetary gear 71 is fixed to the hub portion 73a of the first planetary sprocket 73 extending in the axial direction of the first planetary shaft 76.

The second planetary gear 72 has a larger number of teeth and a larger diameter than the first planetary gear 71, and is rotatably supported by the carrier 6 via the second planetary shaft 77. In addition, the second planetary shaft 77 is provided with a second planetary sprocket 74 having a diameter larger than that of the first planetary sprocket 73, and is configured such that the second planetary sprocket 74 and the second planetary gear 72 rotate integrally.

More specifically, the second planetary sprocket 74 and the second planetary gear 72 are rotatably supported with respect to the second planetary shaft 77, and the second planetary sprocket 74 and the second planetary gear 72 are connected by a bolt 78 as a fastening member so as to rotate integrally. The first planetary sprocket 73 and the second planetary sprocket 74 are drivingly connected by a planetary chain 75, whereby the first planetary gear 71 and the second planetary gear 72 are drivingly connected. Furthermore, a tensioner roller (not illustrated) is disposed between the first planetary sprocket 73 and the second planetary sprocket 74 to apply an appropriate tension to the planetary chain 75 so as not to cause tooth jumping.

The ring gear 9 has a drum-like shape and includes a bottom portion 91 extending in the radial direction and a flange portion 92 extending in the axial direction from an outer peripheral edge portion of the bottom portion 91. The bottom portion 91 is fixed to the flange portion 3a of the output shaft 3 by a fastener 93 such as a bolt. The flange portion 92 is configured separately from the bottom portion 91, and is fixed to the bottom portion 91 by a fastener 95 such as a bolt. A tooth surface that meshes with the second planetary gear 72 is formed on the inner peripheral surface of the flange portion 92. The ring gear 9 has a larger number of teeth and a larger diameter than those of the sun gear 5 and the first and second planetary gears 71 and 72.

With such a configuration, when input rotation is input to the input shaft 2, the sun gear 5 rotates. When the sun gear 5 rotates, power is transmitted to each of the three planetary units 7 via the first planetary gear 71 meshing with the sun gear 5. Since the carrier 6 is fixed to these three planetary units 7, when rotation is input from the sun gear 5, each of the rotating bodies 71,72,73, and 74 rotates without revolving. More specifically, since the second planetary sprocket 74 is a sprocket having a larger T number than the first planetary sprocket 73, the rotation input from the sun gear 5 is decelerated and transmitted to the ring gear 9 by the second planetary gear 72. The ring gear 9 is rotated by the second planetary gear 72, whereby a rotation decelerated from the output shaft 3 integrated with the ring gear 9 than the rotation speed of the input shaft 2 is output.

Axial Length of Chain-type Planetary Sprocket Reducer

Next, the axial length of the chain-type planetary sprocket reducer 1 will be described. As described above, in the present embodiment, the planetary unit 7 does not directly wind the planetary chain 75 around the sun gear 5, but includes the first planetary gear 71 as an intermediate gear, and meshes the first planetary gear 71 with the sun gear 5.

Therefore, even when the speed reducer 1 according to the present embodiment includes the plurality of planetary units 7, the speed reducer 1 is configured to change the phase of these planetary units 7 so that the axial positions of the first planetary sprocket 73, the second planetary sprocket 74, and the planetary chain 75 of each planetary unit 7 can coincide with each other.

Figure 3A:
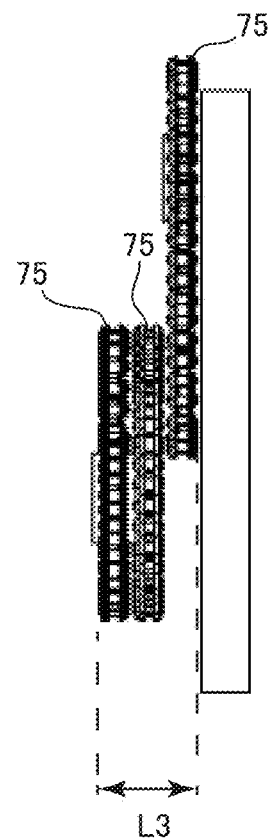
FIG. 3A is a side view illustrating a planetary gear device according to a comparative example.

When the plurality of planetary chains 75 is directly wound around the sun gear 51, it is necessary to arrange the chains 75 offset in the axial direction so as not to interfere with each other. Therefore, as in the comparative example illustrated in FIG. 3A, when three planetary units are arranged, a width L3 corresponding to at least three chains is required.

Figure 3B:
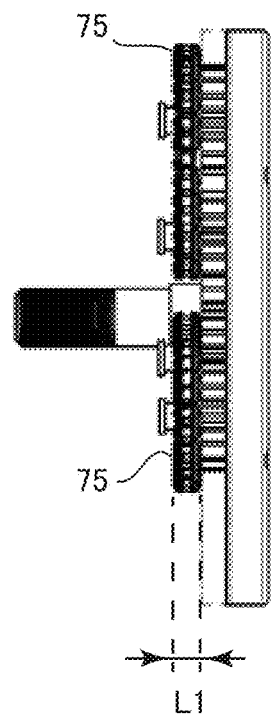
FIG. 3B is a side view illustrating the planetary gear device according to the present embodiment.

On the other hand, in the present embodiment, as illustrated in FIG. 3B, since the planetary chains 75 are arranged with their axial positions overlapped with each other, even when three planetary units 7 are arranged, the planetary chains can be arranged with a width L1 corresponding to one chain. Therefore, even if the allowable torque is the same between the speed reducer of the comparative example and the speed reducer 1 according to the present embodiment, the speed reducer 1 according to the present embodiment can be configured to have a compact axial length.

In addition, as illustrated in FIG. 2, the gear trains of the sun gear 5 and the first planetary gear 71, and the ring gear 9 and the second planetary gear 72 are located on the radially inner side of the tooth surface of the ring gear 9, while the drive trains of the first planetary sprocket 73, the second planetary sprocket 74, and the planetary chain 75 are arranged to be offset toward the input shaft side in the axial direction with respect to the ring gear 9. For this reason, the tooth tip position of the second planetary sprocket 74 is located radially outside the tooth tip of the ring gear 9, and the planetary sprockets 73 and 74 having a larger diameter can be used. Therefore, the degree of freedom of design is wide, and the gear ratio can be designed in a wide range.

(Tension Adjustment Mechanism)

Next, a tension adjustment mechanism for the planetary chain 75 will be described. In the tension adjusting mechanism according to the present embodiment, the tension adjusting mechanism of the planetary chain 75 is configured by enabling the second planetary sprocket 74 to be attached at a plurality of different phases.

Figure 4:
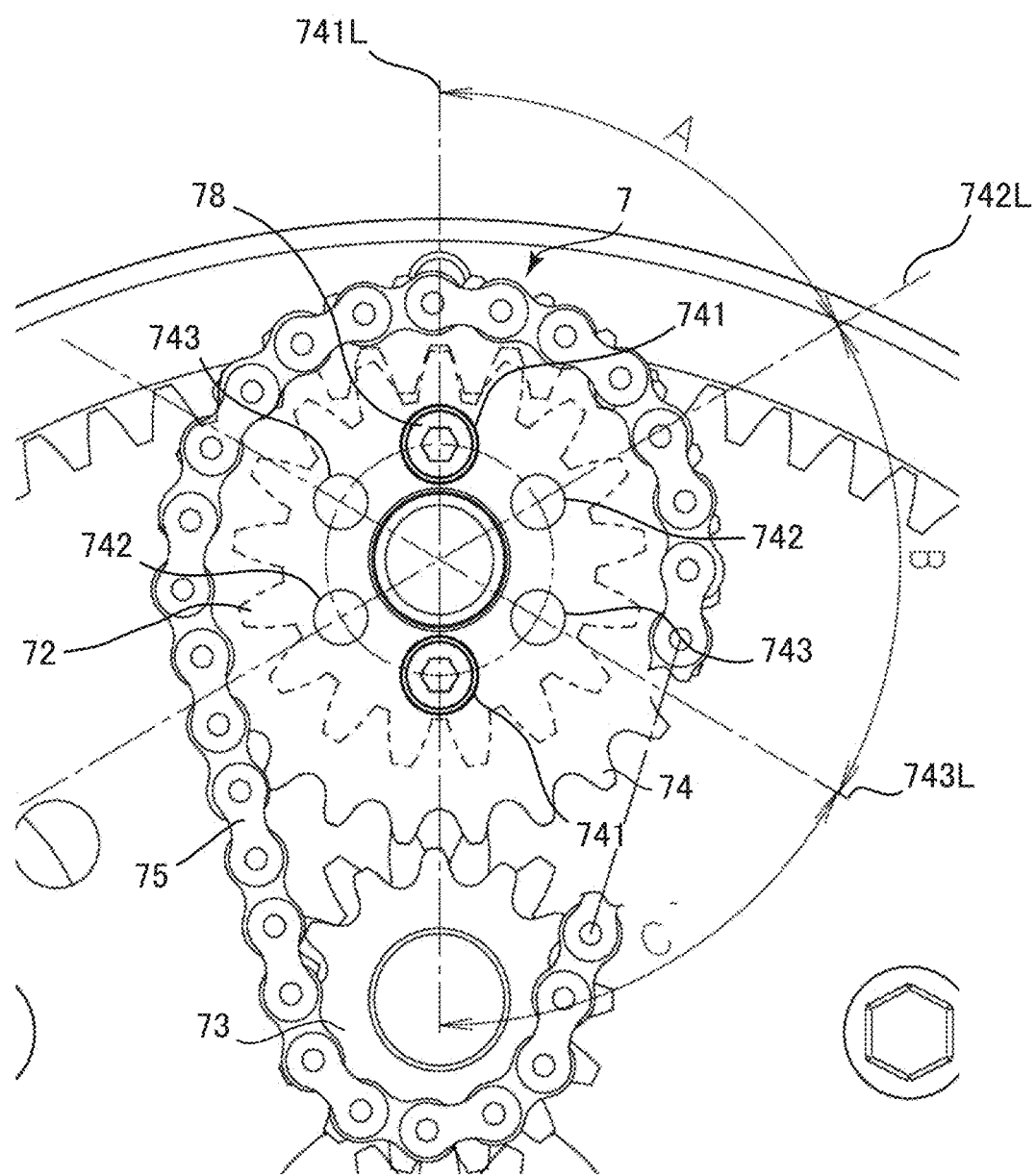
FIG. 4 is a view for explaining a tension adjusting mechanism of the planetary chain 75.

Specifically, as illustrated in FIG. 4, six attachment holes 741~743 for bolts 78 for fixing the second planetary sprocket 74 to the second planetary gear 72 are formed in the side surface of the second planetary sprocket 74. In these attachment holes 741 to 743, two attachment holes located diagonally form one set, and the second planetary sprocket 74 can be attached at three different phases having different degrees of progress of meshing between the planetary chain 75 and the second planetary sprocket 74.

That is, the angles A, B, and C in FIG. 4 have different phases, and the second planetary sprocket 74 can be fixed to a first attachment position fixed by the first attachment hole 741, a second attachment position fixed by the second attachment hole 742, and a third attachment position fixed by the third attachment hole 743. It can be seen that the positions at which the imaginary lines 741L to 743L connecting the centers of the attachment holes 741 to 743 intersect the tooth surface between the adjacent tooth tips are different in phase from each other in the rotation direction of the second planetary sprocket 74 at the first to third attachment positions, and the first to third attachment positions are positions having different degrees of progress in the degree of progress of meshing between the planetary chain 75 and the second planetary sprocket 74.

As described above, since the distance from the center of the sprocket changes according to the degree of progress of the engagement with the sprocket in the chain, the relative phase of the second planetary sprocket 74 with respect to the first planetary sprocket 73 can be changed by changing the fixing position of the second planetary sprocket 74 between the first to third attachment positions, and the tension of the planetary chain 75 can be adjusted.

As described above, in the present embodiment, the plurality of attachment holes 741~743 and the bolt 78 constitute the tension adjusting mechanism, and as illustrated in FIG. 4, it is possible to fix the second planetary sprocket 74 at a plurality of phase positions having different degrees of progress of engagement of the chain with respect to the first planetary sprocket 73 at the first phase position. The tension of the planetary chain 75 can be adjusted by changing the relative rotational phase relationship (rotational positional relationship) between the first planetary sprocket 73 and the second planetary sprocket 74.

<Summary>

A planetary gear device (1) according to the present embodiment including:
- a sun gear (5);
- a carrier (6);
- a plurality of planetary units (7) provided on the carrier (6); and
- a ring gear (9),
- wherein each of the planetary units (7) includes,
  - a first planetary gear (71) meshed with the sun gear (5) and rotatably supported by the carrier (6),
  - a second planetary gear (72) meshed with the ring gear (9) and rotatably supported by the carrier (6),
  - a first rotating body (73) arranged coaxially with the first planetary gear (71),
  - a second rotating body (74) arranged coaxially with the second planetary gear (72), and
  - a winding transmission body (75) wound around the first rotating body (73) and the second rotating body (74), and
  - each of the winding transmission bodies (75) of the plurality of planetary units (7) is arranged such that at least a part of the winding transmission body overlaps with another winding transmission body in an axial direction when viewed from a direction orthogonal to the axial direction.

As described above, the planetary gear device 1 can be configured to be compact in the axial direction by arranging each of the winding transmission bodies 75 of the plurality of planetary units 7 such that at least part of the winding transmission body overlap with another winding transmission body in the axial direction when viewed from the direction orthogonal to the axial direction. In particular, in the case of a motorcycle using a high rotation and low torque motor as a driving source, the axial length of the motor becomes long, and thus the axial length of the transmission is required to be shortened. However, by using the planetary gear device 1 according to the embodiment of the present application, a transmission compact in the axial direction can be configured. Note that the drive source is not limited to a motor, and may be, for example, an engine, and is not limited to a motorcycle, and the planetary gear device 1 according to the embodiment of the present application can be used for a transmission of a bicycle, an automobile, or the like.

In addition, in the planetary gear device 1 according to the present embodiment, compared with a general gear-type planetary gear mechanism, the use of the winding transmission body 75 facilitates adjustment of backlash, and can reduce design and assembly costs. Furthermore, the allowable torque can be easily changed by changing the size and number of the winding transmission body 75. In addition, since the number of planetary units 7 can be changed without changing the axial length of the planetary gear device 1, it is possible to increase the allowable input value while keeping the planetary gear device 1 compact.

In the above-described embodiment, the example in which the planetary gear device 1 is used as a speed reducer by fixing the carrier 6 has been described, but the present invention is not limited thereto, and the planetary gear device 1 can create not only deceleration but also acceleration rotation and reverse rotation by changing input, output, and fixation among the three elements of the sun gear 5, the carrier 6, and the ring gear 9. For example, it is possible to function as a speed-up gear by using carrier fixation, ring gear input, and sun gear output.

Figure 5:
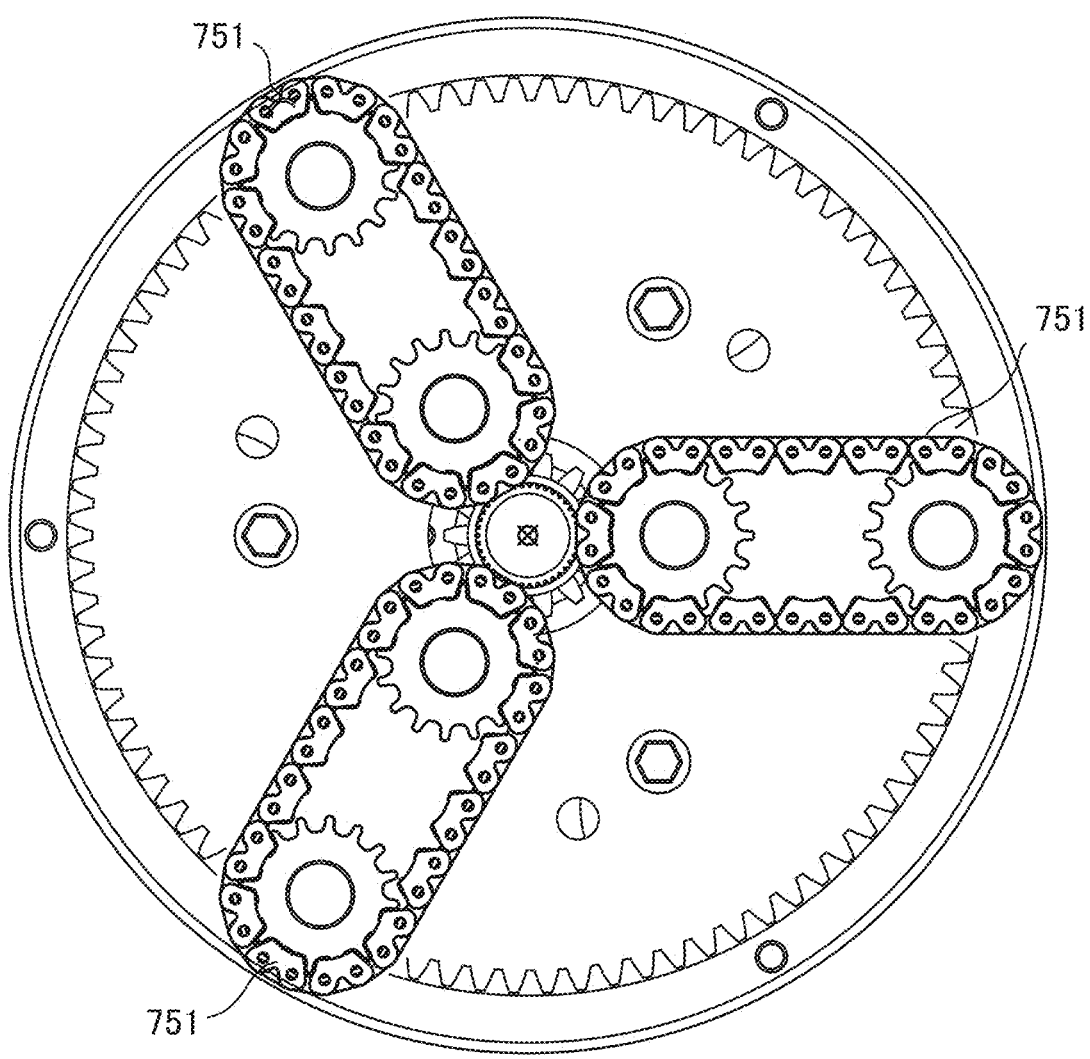
FIG. 5 is a front view illustrating a planetary gear device according to a modification example with a carrier removed.

In the present embodiment described above, the planetary chain 75 is exemplified as the winding transmission body, the first planetary sprocket 73 is exemplified as the first rotating body, and the second planetary sprocket 74 is exemplified as the second rotating body. However, the planetary chain 75 may be another type of chain instead of the roller chain. For example, as illustrated in FIG. 5, the planetary chain may include a silent chain 751. The winding transmission body is not necessarily a chain, and may be, for example, a toothed belt, a flat belt, a V-belt, or the like. Further, the first rotating body and the second rotating body may be formed of a pulley or the like.

Furthermore, the first planetary gear 71 and the first planetary sprocket 73 may be provided integrally, and the second planetary gear 72 and the second planetary sprocket 74 may be provided integrally. In addition, the first planetary gear 71, the first planetary sprocket 73, the second planetary gear 72, and the second planetary sprocket 74 may have any size, and for example, the first planetary sprocket 73 and the second planetary sprocket 74 may be configured to have the same T number. Furthermore, in the above-described embodiment, the relative rotational phase relationship (rotational positional relationship) between the first planetary sprocket 73 and the second planetary sprocket 74 can be changed by configuring the second planetary sprocket 74 to be attachable to a plurality of positions, but the first planetary sprocket 73 may be configured to be attachable to a plurality of positions. In addition, as long as the relative rotational phase relationship (rotational positional relationship) between the first planetary sprocket 73 and the second planetary sprocket 74 can be changed, the position of the sprocket does not necessarily need to be fixed by the bolt and the attachment hole, and for example, the position of the sprocket may be fixed by fitting of irregularities or the like.

INDUSTRIAL APPLICABILITY

The present invention can be widely implemented in the field of planetary gear devices.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A planetary gear device comprising:
   a sun gear,
   a carrier, a plurality of planetary units provided on the carrier, and
a ring gear,
wherein each of the planetary units includes,
- a first planetary gear meshed with the sun gear and rotatably supported by the carrier,
- a second planetary gear meshed with the ring gear and rotatably supported by the carrier,
- a first rotating body arranged coaxially with the first planetary gear,
- a second rotating body arranged coaxially with the second planetary gear, and
- a winding transmission body wound around the first rotating body and the second rotating body, and each of the winding transmission bodies of the plurality of planetary units is arranged such that at least a part of the winding transmission body overlaps with another winding transmission body in an axial direction when viewed from a direction orthogonal to the axial direction.

* * * * *